United States Patent [19]

Aoyagi et al.

[11] 4,444,663
[45] Apr. 24, 1984

[54] MEMBRANE AND METHOD FOR MANUFACTURE THEREOF

[75] Inventors: Juuro Aoyagi, Naritanishi; Kazuhiko Suzuki, Yamato; Kazuaki Takahara, Tokyo, all of Japan

[73] Assignee: Terumo Corporation, Tokyo, Japan

[21] Appl. No.: 302,214

[22] Filed: Sep. 14, 1981

[30] Foreign Application Priority Data

Sep. 16, 1980 [JP] Japan ................................ 55-127158
Sep. 16, 1980 [JP] Japan ................................ 55-127159

[51] Int. Cl.³ ............................................ B01D 39/00
[52] U.S. Cl. ................................ 210/500.2; 264/49; 264/199; 264/209.1; 264/561; 428/398
[58] Field of Search .................. 106/167; 264/199, 49, 264/344, 204.1, 561; 210/500.2; 428/398

[56] References Cited

U.S. PATENT DOCUMENTS

| | | | |
|---|---|---|---|
| 1,707,164 | 3/1929 | Kauplus | 264/49 |
| 2,471,039 | 5/1949 | Orthner et al. | 106/167 |
| 2,901,813 | 9/1959 | Schappel | 264/199 |
| 3,093,446 | 6/1963 | Allewelt | 106/167 |
| 3,318,990 | 5/1967 | Kajitani et al. | 264/191 |
| 3,497,584 | 2/1970 | Bridgeford et al. | 264/187 |
| 3,785,918 | 1/1974 | Kawai et al. | 264/188 |
| 3,888,771 | 6/1975 | Isuge et al. | 264/199 |
| 4,104,214 | 8/1978 | Meierhoefer | 264/188 |
| 4,164,437 | 8/1979 | Henne et al. | 264/173 |
| 4,165,743 | 8/1979 | Denning | 264/191 |
| 4,263,244 | 4/1981 | Allen et al. | 264/191 |

FOREIGN PATENT DOCUMENTS 47-51970 12/1972 Japan ................................ 264/199

*Primary Examiner*—Jay H. Woo
*Attorney, Agent, or Firm*—Frishauf, Holtz, Goodman & Woodward

[57] ABSTRACT

A liquid composition for the manufacture of a membrane, comprising a reaction product a cuprammonium cellulose with an ammonium or alkali metal salt of a polymer containing 10 to 70 equivalent percent of a carboxyl group and having a number-averaged molecular weight in the range of from 500 to 200,000, and a membrane is obtained by molding the composition in the form of a film, immersing the shaped article thus obtained in a dilute sulfuric acid solution thereby coagulating and regenerating it, subsequently immersing the shaped article in an strong alkali solution thereby expelling said ammonium or alkali metal salt of the polymer therefrom and forming therein fine pores substantially corresponding to the molecular weight of said salt.

19 Claims, 1 Drawing Figure

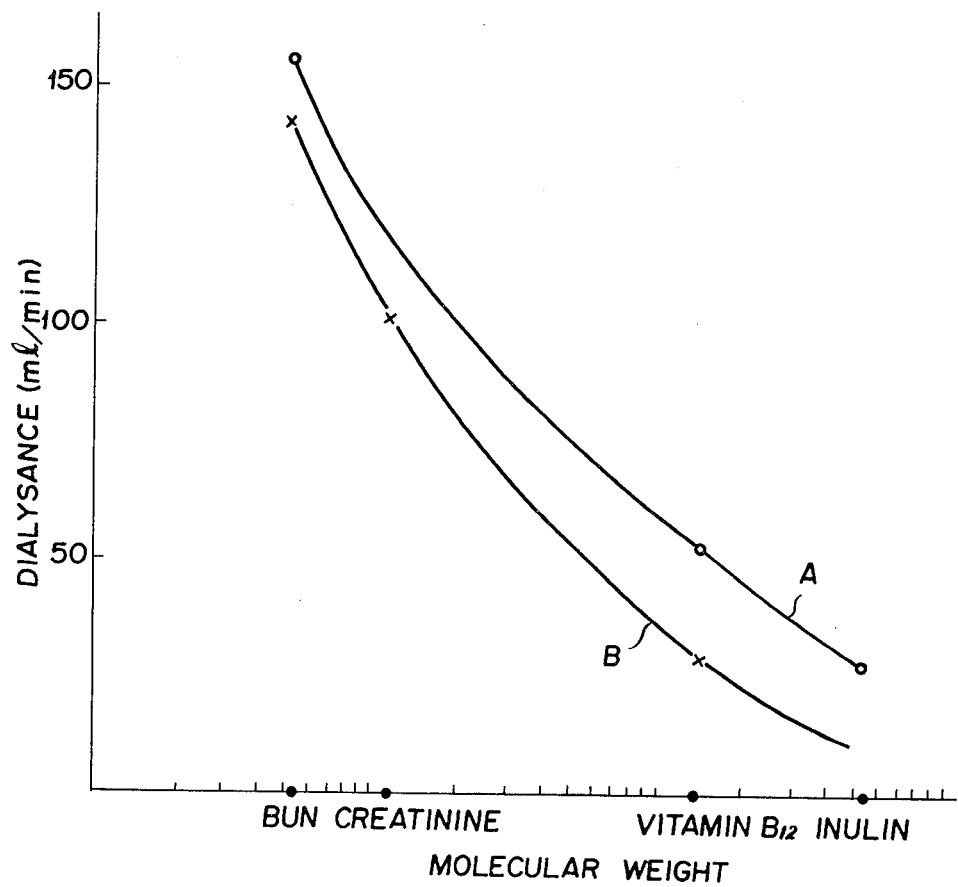

MEMBRANE AND METHOD FOR MANUFACTURE THEREOF

BACKGROUND OF THE INVENTION

1. Field of the Invention

This invention relates to a liquid composition for the preparation of a permeable membrane and to a method for the manufacture of the permeable membrane. More particularly, this invention relates to a liquid composition for the preparation of a permeable membrane (hereinafter referred to "membrane") to be used as in a mechanical kidney, plasma separator, etc. and to a method for the manufacture of the membrane.

2. Description of Prior Arts

Mechanical kidneys and other devices for the filtration of body fluids operated by means of osmosis, ultrafiltration, etc. have achieved notable growth and have come to find extensive utility in the medical field. In such mechanical kidneys and other devices for the filtration of body fluids, extremely fine hollow fibers and membranes adapted for dialysis of body fluids are playing the most important role. These transmitting membranes such as hollow fibers for dialysis are represented by hollow fibers made of regenerated cellulose which is obtained by the deacetation of cellulose triacetae. The hollow fibers are deficient in water permeation capacity and, therefore, require a long time for the treatment of blood. At times, the treatment by use of such hollow fibers inevitably necessitates prolonged confinement of patients. And, such prolonged confinement possibly brings about undesirable results particularly in the case of senile patients and patients of delicate physical conditions. Hollow fibers made of cellulose esters have been proposed. Adoption of cellulose esters as the raw materials obviates the complicate work of deacetation inevitably entailed when regenerated cellulose is used as the raw material. The hollow fibers using such cellulose esters exhibit rather satisfactory water permeation capacity. When these cellulose esters are prepared in the form of dopes for spinning, however, they pose a problem of hygienic safety. In one of such dopes, for example, acetyl cellulose is used in a concentration of 30 weight percent in the mixture of acetone and formamide (40:60).

With a view to eliminating the faults found with the hollow fibers made of regenerated cellulose derived from cellulose triacetate or those made of cellulose acetate, a method for the preparation of hollow fibers has been proposed which comprises a steps of extruding the spinning dope of cuprammonium cellulose through annular spinning orifices, allowing the continuously extruded hollow tubes to fall down gravitationally and, during the descent of the hollow tubes, filling to capacity the interiors of the continuous hollow tubes formed from the dope with a liquid incapable of coagulating the spinning dope, then allowing the descending hollow tubes to be amply fluidly elongated by the gravitational pull exerted thereon, and thereafter immersing the elongated hollow tubes in a dilute sulfuric acid solution to be coagulated and regenerated (Japanese Patent Publication No. 1363/1980). Although the hollow tubes of cuprammonium cellulose thus prepared exhibit higher water transmitting capacity than those made of regenerated cellulose derived from cellulose triacetate and those made of cellulose esters, they are capable of being permeated only by low molecular compounds such as, for example, urea and vitamin $B_{12}$ and incapable of being permeated by compounds of medium and high molecular weights. When they are used in a mechanical kidney, for example, they betray a disadvantage that melanin pigments and other similar matter gradually accumulate on their walls.

An object of the present invention, therefore, is to provide a liquid composition for the manufacture of a novel membrane and a method for the manufacture of the membrane.

Another object of this invention is to provide a liquid composition for the manufacture of a membrane capable of passing compounds of not merely low molecular weights but also medium and high molecular weights and a method for the manufacture of the membrane.

Yet another object of this invention is to provide a method for the manufacture of dialytic hollow fibers capable of being permeated by substances of low molecular weights and substances of medium and high molecular weights as well.

SUMMARY OF THE INVENTION

These objects are accomplished by a liquid composition for the manufacture of a membrane, which comprises a reaction product of cuprammonium cellulose with an ammonium or alkali metal salt of a polymer containing 10 to 70 equivalent percent of a carboxyl group and having a number-averaged molecular weight in the range of from 500 to 200,000.

The objects are also accomplished by a method for the manufacture of a membrane, which comprises the steps of molding a liquid composition comprising a reaction product of cuprammonium cellulose with an ammonium or alkali metal salt of a polymer containing 10 to 70 equivalent percent of a carboxyl group and having a number-averaged molecular weight in the range of from 500 to 200,000, in the form of film, immersing the shaped article thus produced in a dilute sulfuric acid solution thereby coagulating and regenerating the liquid composition, and subsequently immersing the shaped article in an aqueous strong alkali solution thereby expelling the ammonium or alkali metal salt from the aforementioned polymer and forming in the shaped article fine pores corresponding to the molecular weight of the expelled salt.

According to this invention, the ammonium or alkali metal salt of a polymer containing 10 to 70 equivalent percent of a carboxyl group and having a number-averaged molecular weight in the range of from 500 to 200,000 is used as a permeation capacity regulator (pore diameter regulator) in the reaction with cuprammonium cellulose. After the liquid composition comprising the reaction product has been molded in the shape of a membrane and coagulated and regenerated, the aforementioned salt of the polymer is expelled from the membrane. The diameter of the pores to be formed in the membrane and the permeation capacity of the membrane, therefore, can be predetermined precisely with fair freedom by suitably selecting the molecular weight of the polymer and the amount of the polymer to be used. This invention, therefore, can produce membranes in the form of flat sheets or hollow fibers capable of selectively permeating substances of molecular weights falling within a desired range.

BRIEF DESCRIPTION OF THE DRAWING

The accompanying drawing represents a graph showing the results of a dialysis test conducted on hollow fibers spun from the liquid spinning composition of the present invention.

PREFERRED EMBODIMENT OF THE INVENTION

The polymer to be used in this invention for the reaction with cuprammonium cellolose is a polymer or copolymer which contains in the monomer unit thereof 10 to 70 equivalent percent, preferably 15 to 50 equivalent percent, of carboxyl group and possesses a number-averaged molecular weight in the range of from 500 to 200,000, preferably from 1,000 to 100,000. This polymer is used in the form of an ammonium salt or a salt of an alkali metal such as lithium, sodium or potassium, preferably in the form of an ammonium salt. The reason for the use of the polymer in the form of such a salt as mentioned above is that the salt is readily dissolved in the cuprammonium cellulose dope and allowed easily to react thereof. The presence in the polymer of 10 to 70 equivalent percent of carboxyl group is required for the purpose of causing this group to form a coordinate bond with the copper atoms in the cuprammonium cellulose in the dope. If the carboxyl group content is less than 10 equivalent percent, the aforementioned coordinate bond with the copper atoms is not sufficient. If the carboxyl group content exceeds 70 equivalent percent, then the coordinate bond of the group with the copper atoms is so large as to induce the phenomenon of gelation. The reason for the aforementioned range for the average molecular weight of the polymer containing the carboxyl group is that, as will be described more fully afterward, the molded membrane is expected to form therein countless fine pores corresponding to the aforementioned molecular weight and chemical structure of the polymer after the membrane has been coagulated and regenerated and the aforementioned polymer has been expelled from the membrane. By using a polymer of a molecular weight falling within this range, there can be produced a membrane capable of passing substances of molecular weights falling with a desired range.

Polymers which contain a carboxyl group are numerous. Examples are copolymers of carboxyl group-containing unsaturated monomers such as acrylic acid and methacrylic acid and other copolymerizable monomers. Examples of copolymerizable monomers are alkyl acrylates such as methyl acrylate, ethyl acrylate, isopropyl acrylate, butyl acrylate, hexyl acrylate, and lauryl acrylate, alkyl methacrylates such as methyl methacrylate, ethyl methacrylate, and butyl methacrylate, acrylamide, methacrylamide, acrylonitrile, methacrylonitrile, hydroxyalkyl acrylates (or methacrylates), dialkylamino acrylates (or methacrylates), vinyl acetate, styrene, vinyl chloride, and ethylene. Among these particularly desirable are alkyl acrylates and alkyl methacrylates. The most desirable copolymers, therefore, are acrylic acid-alkyl acrylate (or methacrylate) copolymers, methacrylic acid-alkylacrylate (or methacrylate) copolymers, and partial hydrolyzates of alkyl acrylates (or methacrylates).

The salt of such a carboxyl group-containing polymer is used generally in an amount in the range of from 1 to 40 parts by weight, desirably from 2 to 30 parts by weight, preferably from 3 to 15 parts by weight, based on 100 parts by weight of cellulose.

The reason for the particular range fixed for the amount of the salt is that, as will be described more fully afterward, the amount of fine pores to be formed is determined by the amount of the salt used. If the amount is less than 1 part by weight, the pores are so few that the capacity of membrane for passing substances of desired molecular weights is insufficient. If the amount is more than 40 parts by weight, however, the membrane to be obtained acquires insufficient strength.

The cellulose used for this invention is desired to have an average degree of polymerization in the range of from 500 to 2500. Particularly, the most desirable average degree of polymerization is 1000±100. The cuprammonium cellulose solution is prepared by any of the ordinary methods. For example, it can be obtained by first mixing ammonia water, a basic aqueous copper sulfate suspension, and water to form an aqueous cuprammonium solution, adding thereto an antioxidant (such as, for example, sodium sulfite), and further adding thereto an aqueous sodium hydroxide solution to promote thorough solution of undissolved cellulose. The cuprammonium cellulose solution thus obtained is mixed with the prescribed amount of the aforementioned salt of polymer as the permeation capacity regulator. This mixture is stirred at a temperature in the range of from 8° to 30° C., preferably from 14° to 25° C. for a period in the range of from 20 to 120 minutes, preferably from 60 to 100 minutes to produce the aforementioned coordinate bond with the cuprammonium cellulose. By further ageing the resultant reaction mixture, the liquid composition for the manufacture of the permeable membrane is obtained. A typical composition, therefore, is as follows (parts by weight):

| | |
|---|---|
| Cellulose | 100 |
| Carboxyl group-containing polymer salt | 3 to 15 |
| Basic copper sulfate | 50 to 200 |
| Sodium sulfite | 25 to 50 |
| Sodium hydroxide | 10 to 50 |
| Ammonia | 100 to 300 |
| Water | 1,000 to 2,000 |

The membrane to be manufactured by this invention can be obtained in any desired form. Examples are hollow tubes and a flat sheet. The thickness of the membrane is in the range of from 5 to 30 microns, preferably from 8 to 20 microns.

Now, the method by which the membrane is manufactured will be described. First, the method for manufacturing this membrane is the form of hollow tubes is as follows. The spinning dope of cuprammonium cellulose having the carboxyl group-containing polymer salt coordinate bonded thereto is extruded through annular spinning orifices and allowed to fall by gravitational pull. During the descent of the hollow tubes of the dope from the spinning orifices, the interiors of the hollow tubes are filled to capacity with a liquid incapable of coagulating the dope. After the hollow tubes have been amply elongated by the gravitational pull exerted thereon during the descent, they are immersed in a dilute sulfuric acid solution to be coagulated and regenerated. The concentration of the dilute sulfuric acid solution is in the range of from 5 to 50 percent, preferably from 15 to 30 percent. Then the hollow tubes are washed with water to remove sulfuric acid adhering thereto.

When necessary, the formed hollow fibers obtained after the step of coagulation and regeneration may be subjected to a treatment for removal of copper still persisting therein. They are now washed with water.

The treatment for the removal of copper is generally carried out by immersing the hollow fibers in a dilute sulfuric acid solution or nitric acid solution of a concentration in the range of from 3 to 30 percent. Subsequently, the hollow fibers are immersed in an aqueous strong alkali solution to expel the aforementioned carboxyl group-containing polymer therefrom. As the result, fine pores corresponding to the molecular weight of the used polymer are formed in the tube wall of the hollow fibers. They are further treated with hot water at a temperature in the range of from 5° to 100° C., preferably from 50° to 80° C., or plasticized by use of an aqueous glycerol solution of a concentration in the range of from 1 to 10 weight percent, preferably from 2 to 5 weight percent to remove copper, copper sulfate, copper hydrogen-sulfate, medium to low molecular cellulose, etc. still remaining therein. Thereafter, they are dried and taken up in a roll. Thus, desired hollow fibers are obtained.

Examples of strong alkalis advantageously usable for the removal of the polymer include sodium hydroxide, potassium hydroxide, lithium hydroxide, and ammonium hydroxide. Such a strong alkali is used in the form of an aqueous solution of a concentration in the range of from 0.1 to 20 percent, preferably from 1 to 15 percent.

In the method described above, the spinning dope may be extruded through the annular spinning orifices directly into the liquid incapable of coagulating the dope and then immersed in the dilute sulfuric acid solution instead of being extruded through the annular spinning orifices into the ambient air and allowed to fall by gravitational pull. Otherwise, at the same time that the spinning dope is extruded and allowed to descend by the gravitational pull, the liquid incapable of coagulating the dope is also extruded concentrically outside the hollow tubes of the dope so that the hollow tubes of the spinning dope are discharged through the spinning orifices as wrapped in tubes of the non-coagulating liquid. The sheathed hollow tubes of the spinning dope are then immersed in the dilute sulfuric acid solution.

The selection of the non-coagulating liquid which is used in the process of the production of hollow fibers has a significant effect upon the maintenance of uniform interior in the hollow fibers or upon the evenness of wall surface of the hollow to be obtained. If the non-coagulating liquid filling the interior of the hollow fibers is suddenly released through the membrane while the interior of the hollow fibers are being dried, a vacuum is formed in the interior of the hollow fibers with a possible result that the tubes will have collapsed or a wrinkled wall will be formed. For this reason, the non-coagulating liquid is selected from among the liquids which sparingly penetrate the hollow fibers during the drying. Examples of desirable non-coagulating liquids are benzene, toluene, xylene, styrene, perchloroethylene, trichloroethylene, light oil, kerosene, heptane, octane, dodecane, liquid paraffins, and isopropyl myristate.

The membrane in the form of a flat sheet is obtained by forcing through an extruding slit the cuprammonium cellulose dope having the prescribed amount of the carboxyl group-containing polymer salt coordinate bonded thereto, allowing the extruded sheet of the dope to fall by the gravitational force exerted thereon, immersing the sheet in the dilute sulfuric acid solution to be coagulated and regenerated therein, and then subjecting the sheet to the same treatment as given to the hollow fibers. Otherwise, the flat sheet may be obtained by inserting a film of cellophane or polyethylene terephthalate in a mold formed of at least two glass plates, pouring the aforementioned spinning dope between the inserted film and one of the glass plates of the mold and allowing the dope to form a sheet, removing the sheet together with the film, immersing the sheet and the film in the dilute sulfuric acid solution to have the sheet coagulated and regenerated, then peeling the film from the sheet, and subjecting the sheet to the same treatment as given to the hollow fibers.

In the present invention, the permeation capacity regulator (pore diameter regulator) incorporated in the liquid composition has an effect of producing in the membrane fine pores (voids) of a diameter corresponding to the molecular weight of this agent. As the number of such voids formed in the membrane increases, the apparent density of the membrane decreases. For example, when hollow fibers are obtained by using a permeation capacity regulator specified by this invention (ammonium salt of an acrylic acid-methyl methacrylate copolymer having a number-averaged molecular weight of about 50,000) in a cuprammonium cellulose having a density of 1.50, the apparent density of the membrane is as shown in the following table.

| Amount added (parts by weight/100 parts by weight) | Apparent density |
| --- | --- |
| 0 | 1.50 |
| 2 | 1.47 |
| 10 | 1.35 |
| 15 | 1.28 |
| 20 | 1.20 |
| 25 | 1.13 |
| 30 | 1.05 |
| 35 | 0.98 |
| 40 | 0.90 |

Now, the manufacture of hollow fibers by use of spinning dopes provided by this invention will be described in detail below with reference to working examples. Wherever percents are mentioned in the working examples, they are percents by weight unless otherwise specified.

EXAMPLE 1

An aqueous cuprammonium solution was prepared by mixing 4136 g of a 28 percent aqueous ammonia solution and 1864 g of a 46 percent basic aqueous copper sulfate suspension. To the solution was added 2730 g of a 10 percent aqueous sodium sulfite solution. In this solution, 860 g of cotton linter pulp having a degree of polymerization of about 1000 was dissolved by stirring and then 1600 g of a 10 percent aqueous sodium hydroxide solution was added. Consequently, an aqueous cuprammonium cellulose solution was obtained. To this aqueous solution was added 155 g of the ammonium salt of an acrylic acid-methyl methacrylate copolymer containing 17.8 equivalent percent of carboxyl group and having a number-averaged molecular weight of about 50,000. The resultant mixture was stirred for 60 minutes as kept at about 25° C. by cooling, to induce a reaction. The reaction mixture was then aged to afford a spinning dope.

The spinning dope thus obtained was led to a spinneret provided with an annular spinning orifice and extruded through the spinning orifice under nitrogen pressure of 6 kg/cm$^2$. The spinning orifice had a diameter of 3.8 mm and the extrusion rate of the spinning dope was fixed at 15.5 ml/min. Through an inlet tube provided in the spinneret for the introduction of a noncoagulating liquid, isopropyl myristate was introduced and discharged into the interior of the extruded tube of the dope. The inlet tube had a diameter of 1.2 mm and the discharge rate of isopropyl myristate was fixed at 5.0 ml/min. Then, the extruded tube of the dope was allowed to fall spontaneously in the space below at a rate of 200 mm and immediately led into a combination coagulation and regeneration bath filled with a 20 percent aqueous sulfuric acid solution and kept at about 20° C., with a bath length of 12 m. At this time, the spinning speed was 100 m/min. Then, the hollow tube was led into a water bath kept at about 20° C. and washed therein at a bath length of about 4 m and then taken up on a winding rack. The tube thus taken up was passed through a bath for the removal of copper filled with a 5 percent aqueous sulfuric acid solution at a bath length of 12 m, then washed with water, and further passed through an alkali bath filled with a 4 percent aqueous sodium hydroxide solution at a bath length of 8 m to expel the aforementioned copolymer salt therefrom. Thereafter, it was washed with water and taken up. In this case, the treating speed was 8 m/min. The tube taken up on the rack was immersed in a tank, soaked in a subsequently added hot water, heated to 70° C., then stirred for one hour under 260 mmHg, and freed of water. This procedure was repeated three times to expel low molecular compounds persisting in the tube. The tube which had undergone the treatment with hot water was passed at a rate of 4.8 m/min through a tunnel type drier furnace (3.45 m in length) kept at 120° C.±10° C., to produce a dry hollow fibers.

The hollow fibers (membrane surface 1.0 m²) thus produced was subjected to a dialysis test by using various reference substances of known molecular weights (urea (BUN) of a molecular weight of 60, phosphate ion of a molecular weight of 95, creatinine of a molecular weight of 113, vitamin $B_{12}$ of a molecular weight of 1355, and inulin of a molecular weight of 5200). The results were as shown in the graph (curve A) of the accompanying drawing. In this test, tap water was used as the liquid for dialysis and was fed at a flow rate ($Q_D$) of 500 m/min. The substitute blood containing the reference substances such as inulin, vitamin $B_{12}$, creatinine, urea, $PO_4^{--}$, etc. was fed at a flow rate ($Q_B$) of 200 ml/min. The dialytic capacity was as shown in the graph (curve A) of Fig. The UFR was fixed at 10.7 ml/mmHg.hr. Control 1

A hollow fibers was obtained by repeating the procedure of Example 1, except that the ammonium salt of acrylic acid-methyl methacrylate copolymer was not used. When this hollow yarn was subjected to the same dialysance test as in Example 1, the results were as shown in the graph (curve B) of Fig. In this case, the UFR was fixed at 4.0 ml/mmHg.hr.

EXAMPLE 2

Hollow fibers were prepared by following the procedure of Example 1, except that the amount of the copolymer salt per 100 parts by weight of cellulose was varied as shown in Table 1. Each of the hollow fibers was similarly tested by using reference substances of known molecular weight (vitamin $B_{12}$ of a molecular weight of 1255, inulin of a molecular weight of 5200, cytochrome C of a molecular weight of 13400, and bovine serum albumin of a molecular weight of 68,000). The results obtained were plotted on a normal probability paper to determine a molecular weight giving an inhibition rate of 50 percent. The average pore diameter was calculated from the following formula using the data described on the normal probability paper. In the formula, $^-d$ denotes an average molecular diameter (average pore diameter) and MW a number-averaged molecular weight.

$$^-d = 1.32(MW)^{\frac{1}{2}}$$

The results were as shown in Table 1 below.

TABLE 1

| Inhibition ratio (%) | Amount added (parts by weight/100 parts by weight) | | | | | |
|---|---|---|---|---|---|---|
| | 0 | 10 | 15 | 20 | 25 | 30 |
| Bovine serum albumin | 100 | 100 | 100 | 100 | 100 | 100 |
| Cytochrome C | 100 | 100 | 100 | 100 | 100 | 100 |
| Inulin | 69.5 | 62.5 | 58.0 | 60.0 | 56.6 | 56.4 |
| Vitamin $B_{12}$ | 12.5 | 9.5 | 8.6 | 7.0 | 5.9 | 5.7 |

The average pore diameter obtained by plotting the results of Table 1 on a normal probability paper for a varying amount of the regulator added was as shown in Table 2

TABLE 2

| Amount added (parts by weight/100 parts by weight) | Average pore diameter (Å) |
|---|---|
| 0 | 19.3 |
| 15 | 20.2 |
| 30 | 20.6 |

The results of the dialysis test performed as in Example 1 were as shown in Table 3 below.

TABLE 3

| Membrane capacity | Amount added (parts by weight/100 parts by weight) | | | | | |
|---|---|---|---|---|---|---|
| | 0 | 10 | 15 | 20 | 25 | 30 |
| BUN (ml/min) | 141 | 150 | 152 | 159 | 151 | 157 |
| Vitamin $B_{12}$ (ml/min) | 30.7 | 32.1 | 40.0 | 47.1 | 46.0 | 50.2 |
| UFR (ml/mmHg.hr) | 2.1 | 2.8 | 4.2 | 5.9 | 6.1 | 6.8 |

EXAMPLE 3

A hollow fibers was obtained by following the procedure of Example 1, except that 155 g of the ammonium salt of an acrylic acid-ethyl acrylate copolymer containing 15 equivalent percent of carboxyl group and having a number-averaged molecular weight of 10,000. When this hollow fibers was subjected to the same dialysis test as in Example 1, the results were as shown in Table 4.

EXAMPLE 4

A hollow fibers was obtained by following the procedure of Example 1, except that the treatment with hot water was substituted by a treatment performed in a 5 percent aqueous glycerol solution at a bath temperature of 30° C. for 60 minutes. When the hollow was subjected to the same dialysis test as in Example 1, the results were as shown in Table 4.

Control 2

A hollow fibers was obtained by following the procedure of Control 1, except that the treatment in hot water was substituted by a treatment performed in a 5 percent aqueous glycerol solution at a bath temperature of 30° C. for 60 minutes. When the hollow fibers was subjected to the same dialysis test as in Example 1, the results were as shown in Table 4.

TABLE 4

|  | Urea | Creatinine | $PO_4^-$ | Vitamin $B_{12}$ | Inulin | UFR |
|---|---|---|---|---|---|---|
| Example 3 | 185 | 170 | 143 | 75.5 | 25.0 | 8.0 |
| Example 4 | 180 | 168 | 140 | 75.0 | 24.5 | 6.0 |
| Control 2 | 160 | 137 | 107 | 37.4 | 5.0 | 3.7 |

What is claimed is:

1. A method for the manufacture of a permeable membrane, which comprises the steps of shaping a liquid composition comprising the reaction product of a cuprammonium cellulose with an ammonium or alkali metal salt of a polymer, said polymer salt being present in an amount of from 2 to 30 parts by weight based on 100 parts by weight of said cuprammonium cellulose, said polymer salt containing 10 to 70 equivalent percent of a carboxyl group and having a number-average molecular weight in the range of from 500 to 200,000 in the form of a shaped article comprising a film formed from said reaction product, immersing said shaped article in a dilute sulfuric acid solution to coagulate and regenerate the shaped article, subsequently immersing the shaped article in an aqueous strong alkali solution to remove said ammonium or alkali metal salt of the polymer from said reaction product containing film which has been coagulated and regenerated to form said permeable membrane having fine pores in spaces from which said salt of the polymer was expelled.

2. The method of claim 1, wherein the reaction of said polymer salt with the cuprammonium cellulose is carried out at a temperature in the range of from 8° to 30° C.

3. The method of claim 1, wherein the polymer in said polymer salt has a number-average molecular weight of from 1,000 to 100,000.

4. The method of claim 1, wherein the cellulose has an average degree of polymerization from 500 to 2,500.

5. The method of claim 1, wherein the polymer containing the carboxyl group is at least one member selected from the group consisting of acrylic acid-alkyl acrylate copolymers, acrylic acid-alkylmethacrylate copolymers, methacrylic acid-alkylacrylate copolymers, methacrylic acid-alkyl methacrylate copolymers, partial hydrolyzates of polyalkyl methacrylates, and partial hydrolyzates of polyalkyl acrylates.

6. The method of claim 1, wherein the polymer in said polymer salt contains the carboxyl group in the range of from 15 to 50 equivalent percent.

7. The method of claim 1, wherein the membrane is in the form of a hollow fibers.

8. The method of claim 7, wherein the membrane is formed by extruding the liquid composition through an annular spinning orifice to form a hollow tube, allowing the extruded hollow tube of the composition to fall by the gravitational force exerted thereon, and filling the interior of the extruded hollow tube of the composition with a liquid not capable of coagulating the composition.

9. The method of claim 1, wherein the membrane is in the form of a flat film.

10. The method of claim 2, wherein the polymer salt is in an amount of from 2 to 30 parts by weight based on 100 parts by weight of the cellulose; the polymer in said polymer salt has a number-average molecular weight of from 1,000 to 100,000; the cellulose has an average degree of polymerization of from 500 to 2,500; and said polymer containing the carboxyl group is at least one member selected from the group consisting of acrylic acid-alkyl acrylate copolymers, acrylic acid-alkylmethacrylate copolymers, methacrylic acid-alkylacrylate copolymers, methacrylic acid-alkyl methacrylate copolymers, partial hydrolyzates of polyalkyl methacrylates, and partial hydrolyzates of polyalkyl acrylates.

11. The method of claim 10, wherein the polymer in said polymer salt contains the carboxyl group in the range of from 15 to 50 equivalent percent.

12. The method of claim 11, wherein the polymer salt is used in an amount in the range of from 3 to 15 parts by weight based on 100 parts by weight of the cellulose.

13. The method of claim 11, wherein the cellulose has an average degree of polymerization of $1,000 \pm 100$.

14. The method of claim 10, wherein the cellulose has an average degree of polymerization of $1,000 \pm 100$.

15. The method of claim 10, wherein said polymer containing the carboxyl group is selected from the group consisting of an arcylic acid-methyl methacrylate copolymer and an acrylic acid-ethyl acrylate copolymer.

16. The method of claim 13, wherein said polymer containing the carboxyl group is an acrylic acid-methyl methacrylate copolymer.

17. The method of claim 13, wherein said polymer containing the carboxyl group is an acrylic acid-ethyl acrylate copolymer.

18. The membrane manufactured by the method of claim 1.

19. The hollow fiber manufactured by the method of claim 8.

* * * * *